(12) United States Patent
Sweeney et al.

(10) Patent No.: US 7,945,292 B2
(45) Date of Patent: May 17, 2011

(54) SYSTEM AND METHOD FOR A REMOTE WIRELESS RINGER

(75) Inventors: Jeffrey Michael Sweeney, Olathe, KS (US); Michael Clayton Robinson, Overland Park, KS (US)

(73) Assignee: Embarq Holdings Company, LLC, Overland Park, KS (US)

(*) Notice: Subject to any disclaimer, the term of this patent is extended or adjusted under 35 U.S.C. 154(b) by 667 days.

(21) Appl. No.: 11/807,626

(22) Filed: May 30, 2007

(65) Prior Publication Data
US 2008/0300024 A1   Dec. 4, 2008

(51) Int. Cl.
*H04M 1/00*   (2006.01)

(52) U.S. Cl. ............ 455/567; 455/412.2; 455/421; 455/41.2

(58) Field of Classification Search .......... 455/557, 455/567, 412.1, 412.2, 419, 421, 466, 41.2, 455/566; 340/574
See application file for complete search history.

(56) References Cited

U.S. PATENT DOCUMENTS

| | | | |
|---|---|---|---|
| 6,435,690 B1* | 8/2002 | Till | 362/88 |
| 6,954,659 B2 | 10/2005 | Tushinsky et al. | |
| 7,130,664 B1* | 10/2006 | Williams | 455/567 |
| 7,623,030 B1* | 11/2009 | Popescu | 340/539.23 |
| 2004/0224670 A1* | 11/2004 | Hull et al. | 455/412.1 |
| 2005/0266891 A1* | 12/2005 | Mullen | 455/567 |
| 2006/0003700 A1* | 1/2006 | Yasuda et al. | 455/41.2 |

OTHER PUBLICATIONS

Bill Ray, The Register; http://www.theregister.co.uk/2007/05/07/how_do_you_carry_a_phone/print.html; May 8, 2007 (pp. 1 of 2).
Jason Chen, Hands on With BlueQ Bluetooth They Work As Advertised, About Gizmodo, http:/gizmodo.com/gadgets/review/hands+on-with-blueq-bluetooth-wristbands-verdict-the; May 21, 2007 (1 of 9 pages).
Non-Final Office Action date mailed Apr. 22, 2010 in U.S. Appl. No. 11/906,100.
Response to Non-Final Office Action filed Jul. 7, 2010 in U.S. Appl. No. 11/906,100.

* cited by examiner

*Primary Examiner* — Dominic E Rego
(74) *Attorney, Agent, or Firm* — SNR Denton US LLP

(57) ABSTRACT

A system and method for extending alerts for a wireless device. A wireless ringer and a wireless device are linked through a wireless connection. User input selecting an alert for the wireless ringer is received. The wireless ringer is alerted in response to receiving an incoming communication on the wireless device in order for a user to access the wireless device to respond to the incoming communication.

17 Claims, 6 Drawing Sheets

SYSTEM AND METHOD FOR A REMOTE WIRELESS RINGER

BACKGROUND

The use of wireless devices has grown nearly exponentially in recent years. The growth is fueled by improved technologies and wireless communication protocols. Despite the advancement in technology, some communication problems still remain and other new problems have been created.

In many cases, wireless devices, such as cell phones, personal digital assistants (PDA), and Blackberry® devices, are quite small. These wireless devices may be very expensive and store large quantities of important information. As a result, the wireless device is frequently stowed in a pocket, backpack purse, luggage, or other bags or personal belonging carriers. In other situations, the clothing or accessories of the wireless user may not accommodate carrying the wireless device on a clip or in a pocket. Consequently, many times the wireless user may be unable to determine when a message is incoming to the wireless device. This may occur because of the location or distance between the wireless user and the wireless device. For example, if the user is in the airport, the user may not be able to hear a cell phone ringing when stowed in the user's luggage. In another example, a majority of women like to keep cell phones in handbags or purses despite the fact that they miss calls approximately fifty percent of the time.

Additionally, the audio, visual, and tactile systems used by the wireless device to alert the user of incoming calls, text messages or emails are quite limited resulting in many missed calls and communication frustration. For example, the user may have set the device to vibrate only and may not feel the vibrations even within a carrier, such as a purse. In any case, a user may be reluctant to place a wireless device in a more secure location for fear that incoming communications may be missed. The user may also feel the need to leave a carrier, such as a purse, open to be able to hear the wireless device thereby exposing the wireless device and other personal items to theft, inadvertent loss, or exposure from the elements.

SUMMARY

To provide a way of alerting a user of incoming communication from a wireless device, a system and method for a remote wireless ringer may be used. One embodiment includes a system and method for extending alerts for a wireless device. A wireless ringer and a wireless device may be linked through a wireless connection. User input selecting an alert for the wireless ringer may be received. The wireless ringer may be alerted in response to receiving an incoming communication on the wireless device in order for a user to access the wireless device to respond to the incoming communication.

Another embodiment provides a remote wireless ringer. The remote wireless ringer may include a transceiver configured to establish a wireless connection with a wireless device. The remote wireless ringer may also include a memory configured to store a plurality of alerts and user preferences. The remote wireless ringer may also include a speaker configured to play one of the number of alerts, wherein the plurality of alerts informs a user of the incoming communication in order to allow the user to access the wireless device to respond to the incoming communication.

Yet another embodiment includes a remote wireless ringer. The remote wireless ringer may include a processor for executing a set of instructions. The remote wireless ringer may also include a memory for storing the set of instructions, wherein the set of instructions link a wireless ringer and a wireless device through a wireless connection, receive user input selecting an alert for the wireless ringer, and alert the wireless ringer in response to receiving an incoming communication on the wireless device, wherein the alert informs a user of the incoming communication in order for the user to access the wireless device to respond to the incoming communication.

BRIEF DESCRIPTION OF THE DRAWINGS

Illustrative embodiments of the present invention are described in detail below with reference to the attached drawing figures, which are incorporated by reference herein and wherein:

FIG. 3 is another implementation of the wireless ringer 106 of FIG. 1;

DETAILED DESCRIPTION OF THE DRAWINGS

An illustrative embodiment of the present invention provides a system and method for a remote wireless ringer. The remote wireless ringer may be used to inform a user that an incoming communication is being received by a wireless device. In particular, the wireless ringer may indicate that a call, text message, email, or other communication is being received by the wireless device. The illustrative embodiments are particularly useful for a user that may have the wireless device stored in a purse, briefcase, or luggage so that the user is unable to hear, feel or otherwise sense the ringing mechanism of the wireless device.

The wireless ringer and wireless device communicate using a wireless connection. The user may position the wireless ringer so that the user may be informed that the wireless device is ringing even when the wireless device is stored or otherwise secured. In one embodiment, the wireless ringer includes a speaker for outputting an alert indicating that the wireless device is receiving an incoming communication. Alternatively, the wireless ringer may include a light emitting diode (LED), vibrator, or text display for indicating that communication is being received by the wireless device. The user may set and store preferences for receiving the alert. The wireless ringer may also play an alarm or alert the user when the wireless connection between the wireless devices is severed because of distance limitations, battery power, or other interference.

Figure 1:
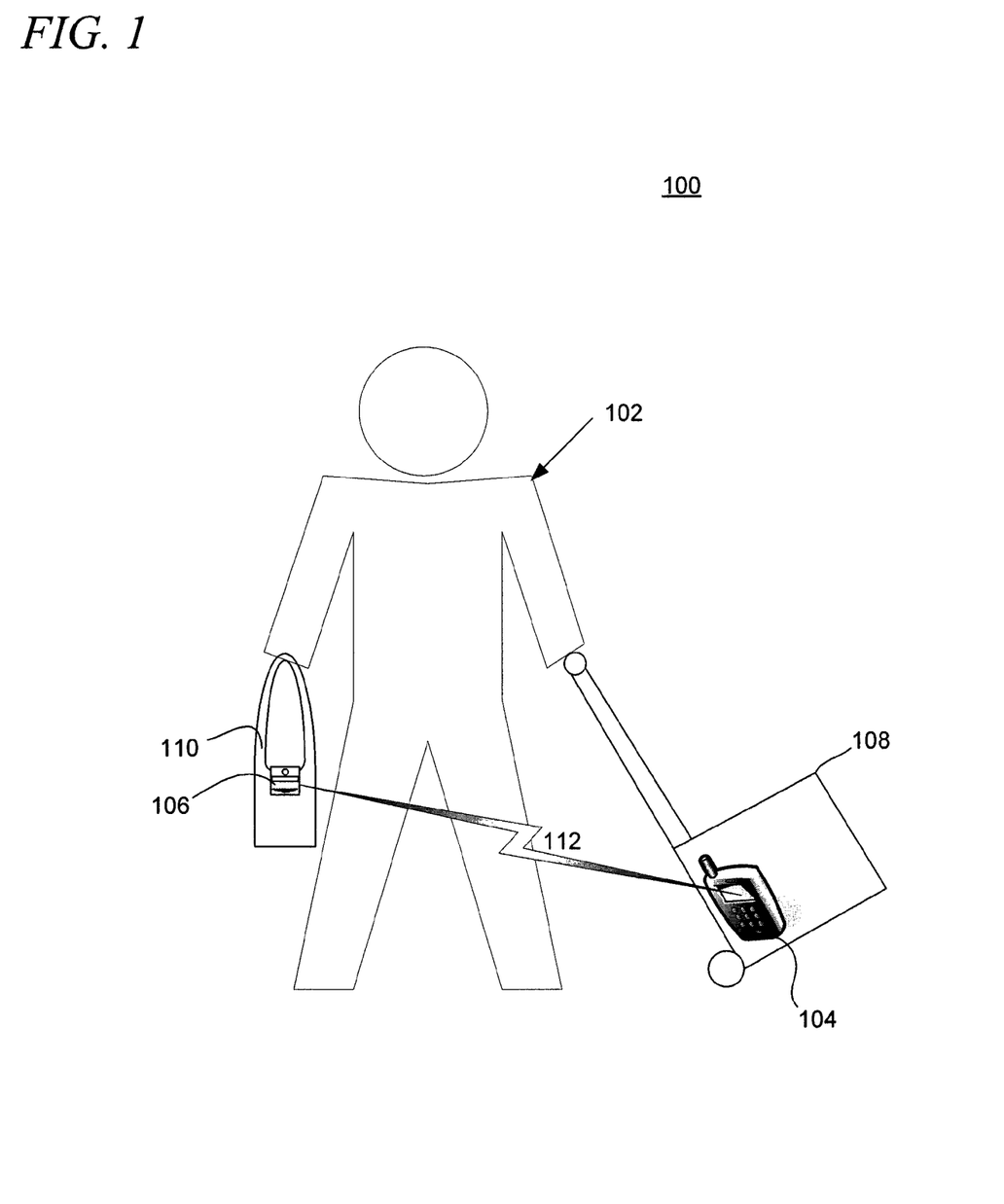
FIG. 1 is an illustrative diagram of a wireless ringer environment in accordance with an illustrative embodiment of the present invention.

FIG. 1 is an illustrative diagram of a wireless ringer environment in accordance with an illustrative embodiment of the present invention. The wireless ringer environment 100 may include numerous elements including a user 102, a wireless device 104, a wireless ringer 106, and carriers 108 and 110. In one embodiment the user 102 has secured the wireless device 104 in the carrier 108 in order to ensure the wireless device 104 is not stolen or inadvertently lost. The carrier 108 may be any storage device used to store and carry personal belongings. For example, the carrier 108 may be a briefcase, luggage, attaché, purse, laptop bag or other carrier. The carrier 110 may also be any type of carrier suitable for storing and carrying belongings of the user. The wireless device 104 may be stored in either carrier 108 or 110. In particular, many female users of the wireless device 104 may securely place the wireless device 104 in a purse.

The wireless ringer 106 may be a remote ringer device used to indicate that a communication is incoming to the wireless device 104. In one embodiment, the wireless device 104 and wireless ringer 106 communicate through a wireless connection 112. The wireless connection 112 may be a communication link or session suitable for communicating control signals, exchanging data, or conveying commands between the wireless device 104 and wireless ringer 106. The wireless connection 112 may be established in any number of ways as described in FIG. 5. In one embodiment, the wireless connection 112 is a Bluetooth or WiFi connection. Alternatively, the wireless connection 112 may be a low-power radio signal that may be used to link devices wirelessly without requiring excessive power from the wireless ringer 106 and wireless device 104. The wireless connection 112 may be established automatically or based on user input and programming. As shown, when the wireless device 104 is stored in the carrier 108, the user 102 may be unable to hear a ring tone or other alert played or otherwise implemented by the wireless device 104 intended to inform the user 102 that a call or other communication is incoming.

In one embodiment, the wireless device 104 may be a cellular phone. However, the wireless device 104 may be any of a mobile phone, personal digital assistant, personal computer, pager, blackberry or other data or voice communication device suitable for wireless communication. The wireless device 104 may incorporate various hardware, firmware, or software for enabling communication and functionality between the wireless device 104 and the wireless ringer 106. In another embodiment, the wireless device 104 may include the hardware and software of the wireless ringer 106 for enabling communication and the features and methods herein described. In on embodiment, the wireless device 104 may include logic for specifying how and when the user prefers to use the wireless ringer 106. Additionally, the wireless device 104 may include a specialized transceiver for sending and receiving data and other information through the wireless connection 112. The wireless device 104 may also include a specialized instruction set that may be executed to operate or work with the wireless ringer 106.

A separation or proximity alarm may play or be activated for both the wireless device 104 and the wireless ringer 106 when separated by a threshold distance. The preferences for the wireless ringer 106 may be set using a better user interface of the wireless device 104 and transmitted to the wireless ringer 106 for implementation. For example, the user 102 may program the functionality of the wireless ringer 106 using a software interface that is stored and executed by the wireless device 104. Once the programming or user preferences are set, the code or instructions for operation of the wireless ringer 106 may be sent to the wireless ringer 106 by a synchronization module of the wireless device 104. The synchronization module may work in conjunction with the wireless connection 112 to synchronize data, instructions, applications, ring tones, or information between the two devices. Software updates and configurations may be downloaded to the wireless device 104 and then synchronized with the wireless ringer 106 based on the synchronization module. Alternatively, the updates and preferences may be downloaded directly to the wireless ringer 106 or synchronized using an interface of the wireless ringer 106 for receiving data from a personal computer or other computing device wirelessly or through a port of the wireless ringer 106.

Figure 2:
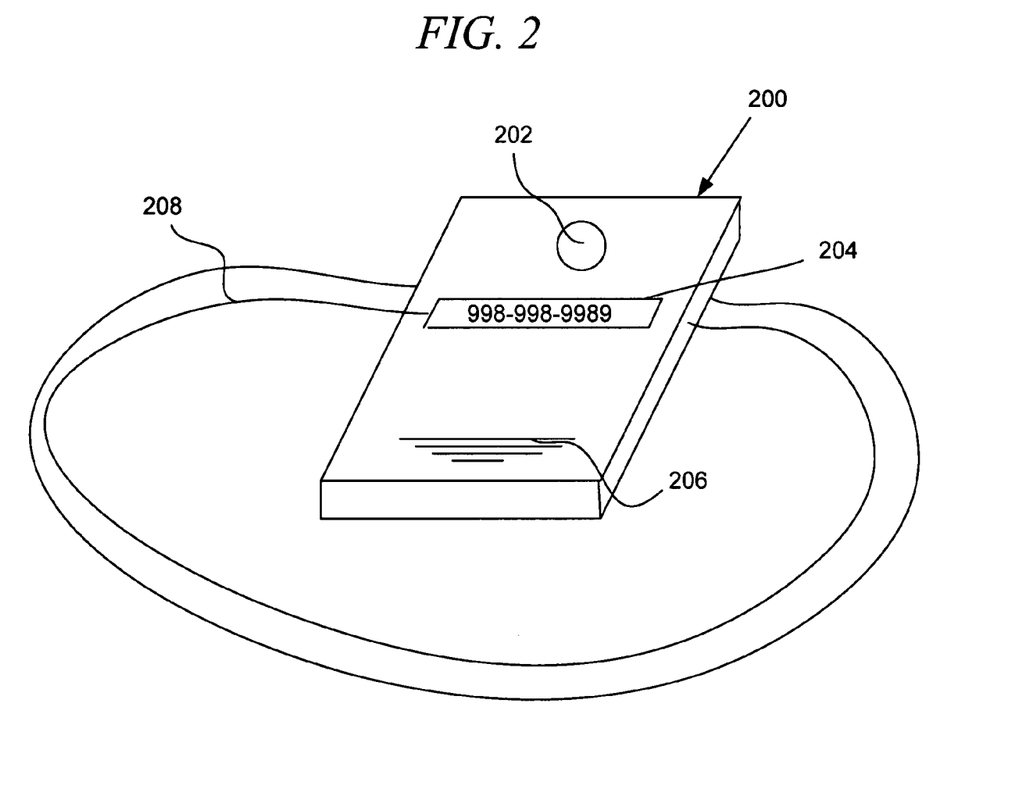
FIG. 2 is a perspective diagram of a wireless ringer in accordance with an illustrative embodiment of the present invention.

The user 102 may position the wireless ringer 106 so that even if the user is unable to hear or receive a communication alert from the wireless device 104, the user may be able to hear, sense or feel an alert from the wireless ringer 106 indicating that communication is incoming to the wireless device 104 as described in FIG. 2. The wireless ringer 106 may be or include a clip, strap, pin, magnet, suction cup, implant, sunglasses, belt buckle, article of clothing, arm band, jewelry, eyeglass attachment, hat, adhesive device, device that sits inside the outer ear, Velcro, or other mechanism for fastening the wireless ringer 106 to a carrier 110 or to the user's person or clothing. The user's person as used herein refers to the body of the user and the user's clothing or personal belongings.

The user 102 may also establish an alert used by the wireless ringer 106 to indicate that a call is incoming to the wireless device 104. In one embodiment, the wireless ringer 106 and the wireless device 104 may synchronize a specified alert as selected by the user using the wireless device 104 through the wireless connection 112. For example, the user 102 may have established a default ring tone for the wireless device 104, that default ring tone may also used by the wireless ringer 106 to indicate that a call or other communication is incoming.

The wireless ringer 106 may use any number of default alerts or may download or retrieve alerts from the wireless device 104 for uniformity and easy recognition of incoming communications. As a result, the wireless ringer 106 may play a different alert based on the type of communication that is being received by the wireless device 104. For example, the user 102 may have specified that the wireless device 104 plays a custom ring tone for incoming voice calls, a simple beep for text messages, a series of beeps and a flashing LED for text messages, and tone and vibration for email messages. The alert played by the wireless device 104 may be similarly played by the wireless ringer 106 so that the user 102 may efficiently determine the type of communication that is incoming in order to determine whether to remove the wireless device 104 from the carrier 108 or to wait until later to access the wireless device 104 to retrieve or answer the incoming message.

The user 102 may also specify any number of alerts that are used to indicate communication is incoming to the wireless device 104. For example, the wireless ringer 106 may be programmed or set to play a single ring tone for all incoming messages. Alternatively, the wireless ringer 106 may use different types of alerts for the different types of communications. For example, when an incoming voice call is received by the wireless device 104, the wireless ringer 106 may flash the number of the calling party and play a custom ring tone linked with the calling party. Similarly, the wireless ringer 106 may be set to vibrate and flash a light emitting diode (LED), administer a minor shock, text display, or perimeter light to alert the user 102 of an incoming email or text message.

The wireless ringer 106 may also play a separation alarm or alert to the user 102 when the wireless connection 112 with the wireless device 104 is severed because of distance limitations, battery power, or other interference. The separation alarm indicates that the wireless ringer 106 is not within a specified distance threshold of the wireless device 104. For example, if the wireless ringer 106 is separated from the wireless device 104 by a distance of more than thirty feet, the wireless ringer 106 and/or the wireless device 104 may play the separation alarm.

The separation alarm may be used for security purposes so that the user knows the position or location of the wireless device 104 at all times. The separation alarm may indicate to the user 102 that a laptop bag with important data used to store the wireless device 104 is no longer within a threshold distance of the wireless ringer 106. As a result, the wireless ringer 106 may operate as a securing mechanism for the wireless device 104 and a storage element in which the wireless device 104 is placed. For example, a user that accidentally leaves a wireless device 104 or carrier 108 may be alerted that the wireless device 104 may be lost or stolen. The separation alarm may be set to incrementally become more active or used different alert mechanisms of the wireless ringer 106 based on distance. For example, the separation alarm may begin subtly by flashing an LED when separated by ten feet and may play a piercing alarm when the distance exceeds forty feet or the wireless connection 112 is severed. The user 102 may establish one or more alarms and associated threshold distances. The separation alarm may guide the user back to a lost wireless device 104 based on a scaled alert system that changes in frequency, intensity, or tone.

FIG. 2 is a perspective diagram of a wireless ringer in accordance with an illustrative embodiment of the present invention. The wireless ringer 200 of FIG. 2 may be a particular implementation of the wireless ringer 106 in the wireless ringer environment 100 of FIG. 1. The wireless ringer 200 may include various elements including an LED 202, a text interface 204, a speaker 206 and a strap 208.

In one embodiment the LED 202, text interface 204 and speaker 206 may be used individually or in combination to alert a wireless user, such as user 102 of FIG. 1, that communication is being received by a wireless device, such as wireless device 104 of FIG. 1. The LED 202 may flash or light up when a call, text message, chat or email is incoming. In one embodiment, the text interface 204 may display the number of a calling party. However, the text interface 204 may display caller identification information or other text suitable to indicate that communication is being received and may inform the user of the identity of the calling party. The text interface 204 may also flash or change colors indicating communications are incoming to the wireless device. In another embodiment, the text interface 204 may display the name or identification of a person sending a chat, text or email message to the user. The text interface 204 may further display portions of the text, chat, or email message, such as a subject or text of the message.

The speaker 206 may be an audio playback device that may be used to play a tone, prompt, ring tone or other audio signal to the user indicating that communication is incoming to the wireless device. The speaker 206 may be used to play an incoming communication alert or a separation alarm in conjunction with the other notification mechanisms of the wireless ringer 200. The wireless ringer 200 may allow the user to set a volume for the speaker 206 based on the user's needs or preferences. For example, the volume may dynamically increase or decrease the longer the alerts are sent to the wireless ringer 200.

The strap 208 may be a fastening strap, or device for securing the wireless ringer 200 to a purse or other carrier. However, the strap 208 may also be any device or mechanism suitable to connect the wireless ringer 200 to the user's clothing or to the user's person. The different elements of the wireless ringer 200 may be used to customize how and when the user receives an alert regarding a message incoming to the wireless device.

Figure 3:
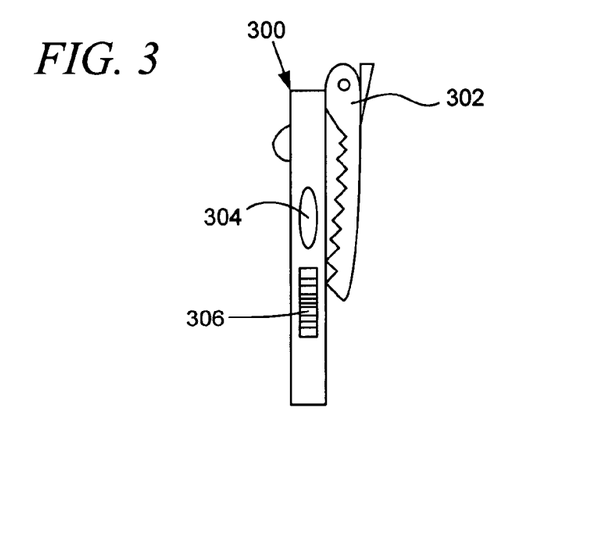
FIG. 3 is a side view of a wireless ringer in accordance with an illustrative embodiment of the present invention.

FIG. 3 is a side view of a wireless ringer in accordance with an illustrative embodiment of the present invention. The wireless ringer 300 may include the elements of the wireless ringer 200 of FIG. 2. In addition, the wireless ringer 300 may further include a clip 302, a button 304 and a dial 306.

The clip 302 may be a hinged or stationary mechanism for securing the wireless ringer 300 to the user's clothing, wireless ringer cradle, or a personal carrier. As a result, the user may use the clip 302 to secure or unsecure the wireless ringer 300 in order to ensure that the user may be alerted of incoming communications to the wireless device. For example, the clip 302 may be used to easily move the wireless ringer 300 from a strap of a carrier to a lapel or pocket of a shirt or blouse. The clip 302 allows the wireless ringer 300 to be positioned dynamically as needed.

The button 304 and the dial 306 may be used to set user preferences and alerts for the wireless ringer 300. In one embodiment, the dial 306 may be used to adjust the volume of the wireless ringer. In another embodiment, the button 304 may be used to send a control signal to the wireless device to place an incoming call on hold or to send a default text message to the calling or messaging party. The button 304 and dial 306 may be used to receive numerous types of user input from the user based on changing circumstances and needs of the user with respect to the wireless ringer 300. In particular, the button 304 and dial 306 may be used to activate, control, engage, or use the features of the wireless device.

Figure 4:
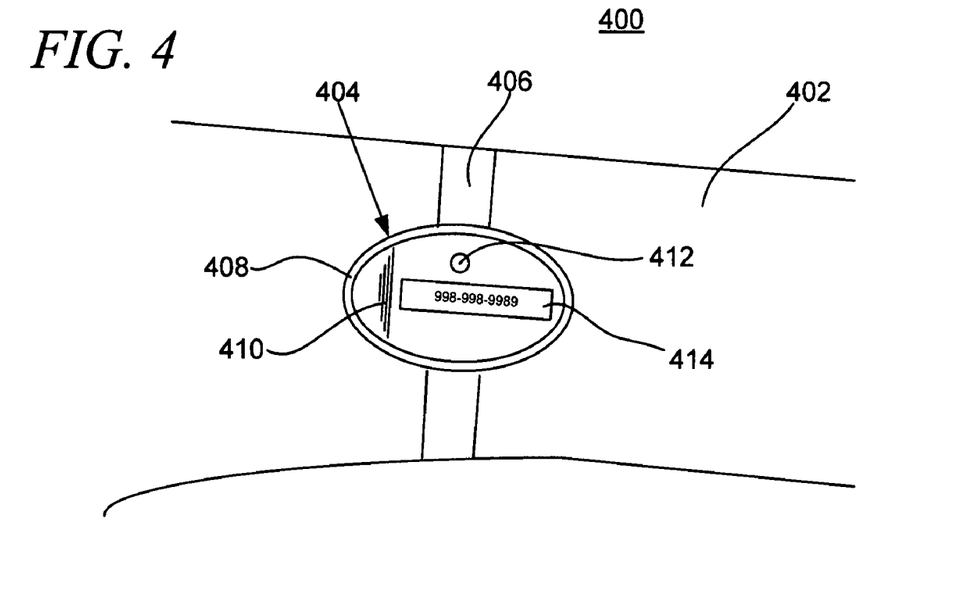
FIG. 4 is a perspective diagram of a wireless ringer worn by a user in accordance with an illustrative embodiment of the present invention.

FIG. 4 is a perspective diagram of a wireless ringer worn by a user in accordance with an illustrative embodiment of the present invention. The wireless ringer environment 400 of FIG. 4 may include a wrist 402, a wireless ringer 404, a strap 406, a perimeter light 408, a speaker 410, a light emitting diode 412, and a text display 414. The wireless ringer 404 is a particular implementation of the wireless ringer 106 of FIG. 1.

In one embodiment the wireless ringer 404 may include the strap 406 in order to allow the user to wear the wireless ringer 404 like a watch, bracelet, ring, or other jewelry. The strap 406 provides the user the flexibility to physically wear the wireless ringer 404 on the wrist 402, arm, finger, neck ankle, or leg in order to alert the user when communications are incoming to a wireless device.

The wireless ringer 404 and the strap 406 may be fashionably designed so that the user feels comfortable wearing the wireless ringer 404 as a fashion accessory or as part of the user's apparel. As a result, the wireless ringer 404 may be positioned so that the alert may be easily detected by the user. For example, when the wireless ringer 404 is worn on the wrist 402 a vibration alert may promptly alert the user that a mobile call is incoming to a cell phone. Alternatively, the speaker 410, light emitting diode 412, and text display 414 may use multiple efforts or types of alerts to inform the user of incoming communications.

The wireless ringer 404 may include the perimeter light 408. The perimeter light 408 may light up as well when communications are incoming. In one embodiment, the perimeter light 408 may allow the alert to be more easily seen by the user. In another embodiment, the wireless ringer 404 may have an internal light and may be housed in a clear or translucent case for allowing the entire wireless ringer 404 to light up when communication is incoming. Alternatively, the LED 412 and text display 414 may flash or light up with any number of lights or color schemes. For example, different colors may be used to indicate the type of communication being received by the wireless device.

Figure 5:
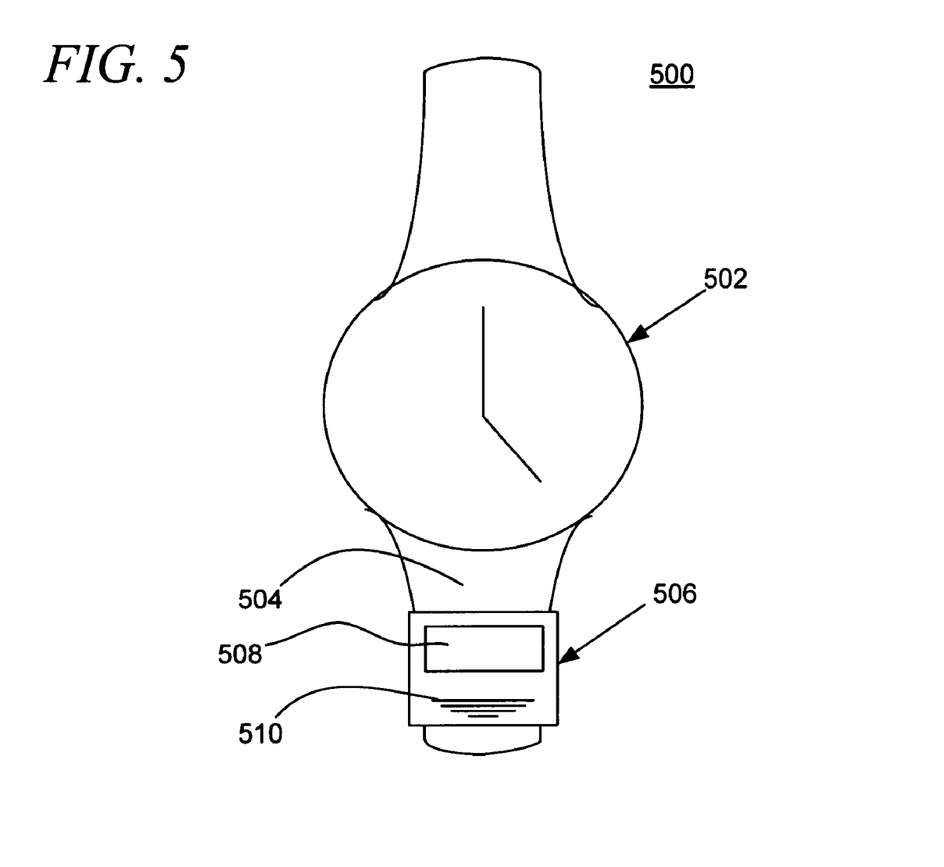
FIG. 5 is a perspective diagram of a wireless ringer attached to a watch in accordance with an illustrative embodiment of the present invention.

FIG. 5 is a perspective diagram of a wireless ringer attached to a watch in accordance with an illustrative embodiment of the present invention. The wireless ringer environment 500 of FIG. 5 may include a watch 502, a strap 504, a wireless ringer 506, a light 508, and a speaker 510. The wireless ringer 506 is a particular implementation of the wireless ringer 106 of FIG. 1.

The wireless ringer 506 may be configured in order to attach or be mounted on the strap 504 of the watch 502. The wireless ringer 506 may also be configured to attach to a bracelet, wallet, pen, belt, or other personal item frequently used by the user. For example, as shown the wireless ringer 506 may attach to the watch 502 for indicating when communications are incoming in a non-intrusive manner. In another embodiment, the watch 502 may include a port or receptacle for receiving the wireless ringer 506 and integrating the functionality of the two devices. As shown, the light 508 may integrate the features of an LED and text display.

Figure 6:
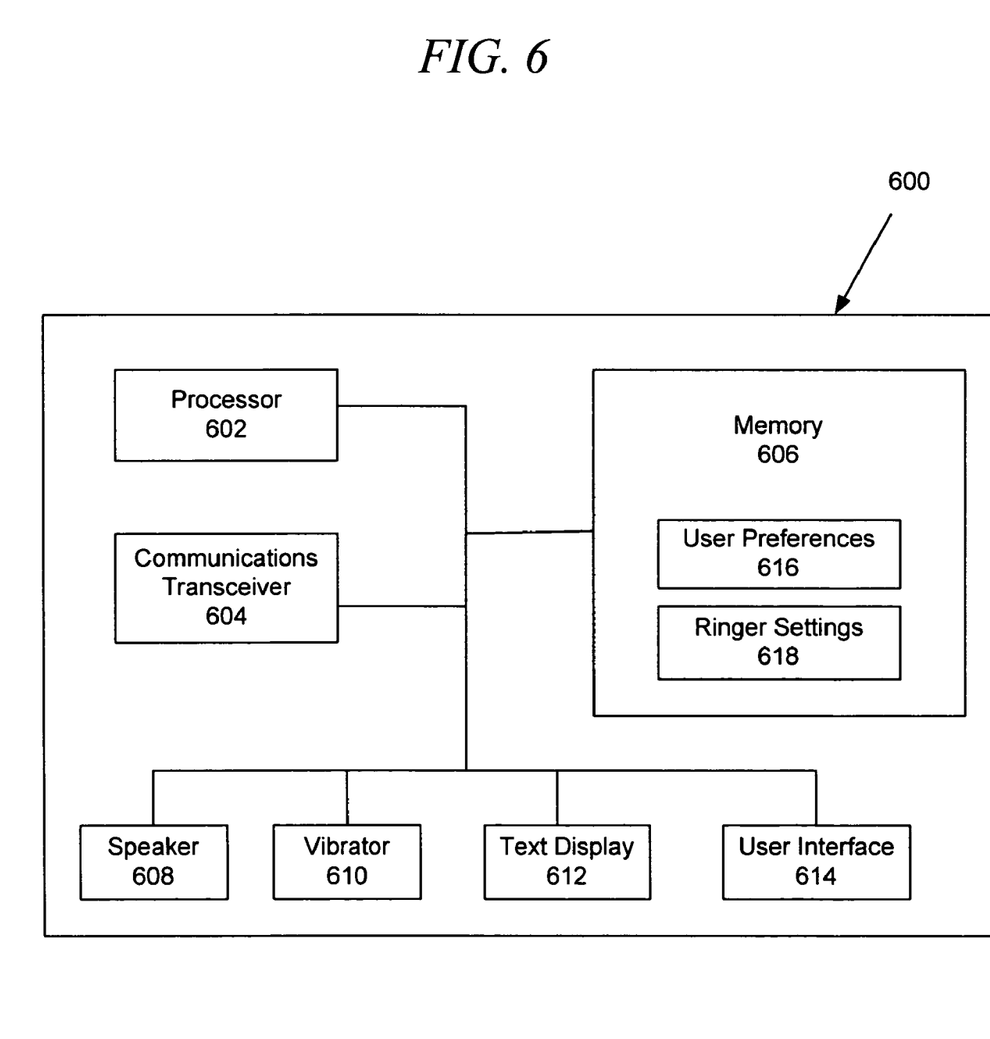
FIG. 6 is a block diagram of a wireless ringer in accordance with an illustrative embodiment of the present invention.

FIG. 6 is a block diagram of a wireless ringer in accordance with an illustrative embodiment of the present invention. The wireless ringer 600 is a particular implementation of the wireless ringer 106 of FIG. 1. The wireless ringer 600 may include various internal components which may include a processor 602, communications transceiver 604, memory 606, a speaker 608, a vibrator 610, a text display 612 and a user interface 614. The memory 606 may further include user preferences 616 and ringer settings 618.

The processor 602 may be a processing unit used to process signals received from the wireless device through the communications transceiver 604. The processor 602 may also be logical components for implementing the features of the wireless ringer 600. The processor 602 may control the functionality inter-operation of the various elements of the wireless ringer 600. For example, the processor may execute a set of instructions to implement the features and functionality of the wireless ringer 600. The wireless ringer may include other hardware and software elements used by communication devices and data processing systems not explicitly described herein. The wireless device in communication with the wireless ringer may include added software or hardware for controlling, interfacing, or otherwise additionally communicating with the wireless ringer 600 to perform any number of communication implementations and features.

The communications transceiver 604 may be the transmitter and receiver used to establish the wireless connection between the wireless ringer 600 and the wireless device. For example, the communications transceiver 604 may include an antenna and Bluetooth circuitry for communicating with the wireless device. Alternatively, the communications transceiver 604 may communicate with the wireless device using any number of radio frequencies or wireless control signals for sending data and/or control signals over the wireless connection. The communications transceiver 604 may alert the processor when the wireless connection has been severed or a separation distance exceeded for activating a separation alarm through the different user notification mechanisms of the wireless ringer.

The memory 606 may be an electronic storage medium for saving instructions for execution by the processor 602. For example, the instructions stored in the memory 606 may detail logic, programs, or code that dictate the functionality of the wireless ringer 600 and how each of the different components interacts with one another and with the user. The user preferences 616 may establish preferences set by the wireless user for operation of the wireless ringer 600. For example, the user preferences 616 may establish when the threshold distance(s) is used to activate the separation alarm.

The ringer settings 618 may establish how and when the user is alerted of incoming communication received by the wireless device. The ringer settings 618 may include any number of default and custom ring tones, sounds, prompts, chirps, and other audio indicators that may be used as an alert. The ringer settings 618 may also specify a default volume level for the wireless ringer 600. The ringer settings 618 or the user preferences 616 may indicate whether the speaker 608, vibrator 610, or text display 612 is used as an alert to indicate a message incoming to the wireless device. The ringer settings 618 and user preferences 616 may be integrated in the user preferences 616 storing information and preferences regarding the operation and functionality of the wireless ringer 600.

As previously discussed, different forms or types of communication may be associated with the speaker 608, vibrator 610 and text display 612. The ringer settings 618 may also control the default settings for the speaker 608, vibrator 610 and text display 612. For example, the speaker 608 may be set to gradually increase in volume each time the wireless device rings and the wireless ringer 600 is informed of the incoming call through the communications transceiver 604. In another example, the vibrator 610 may vibrate once or in a series to indicate to the user that communication is incoming to the wireless device. The ringer settings 618 may also establish how and what information may be displayed in the text display 612 based on the type of incoming communication to the wireless device, the sending or calling party and user preferences. The ringer settings 618 and user preferences 616 may be synchronized or downloaded from the wireless device. For example, the ringer settings 618 may ensure that ring tones or other alerts available on the wireless device are downloaded to the memory 606 of the wireless ringer 400.

The user interface 614 may be an implementation of the button 304 and dial 306 of FIG. 3. Alternatively, the user interface 614 may be a touch screen, touch display, scroll wheel, pointer, or other device that allows the user to provide user input. The functionality, instructions, and preferences of the wireless ringer 600 may be input by a user using the user interface 614 or may be received from the wireless device by the wireless transceiver 404.

Figure 7:
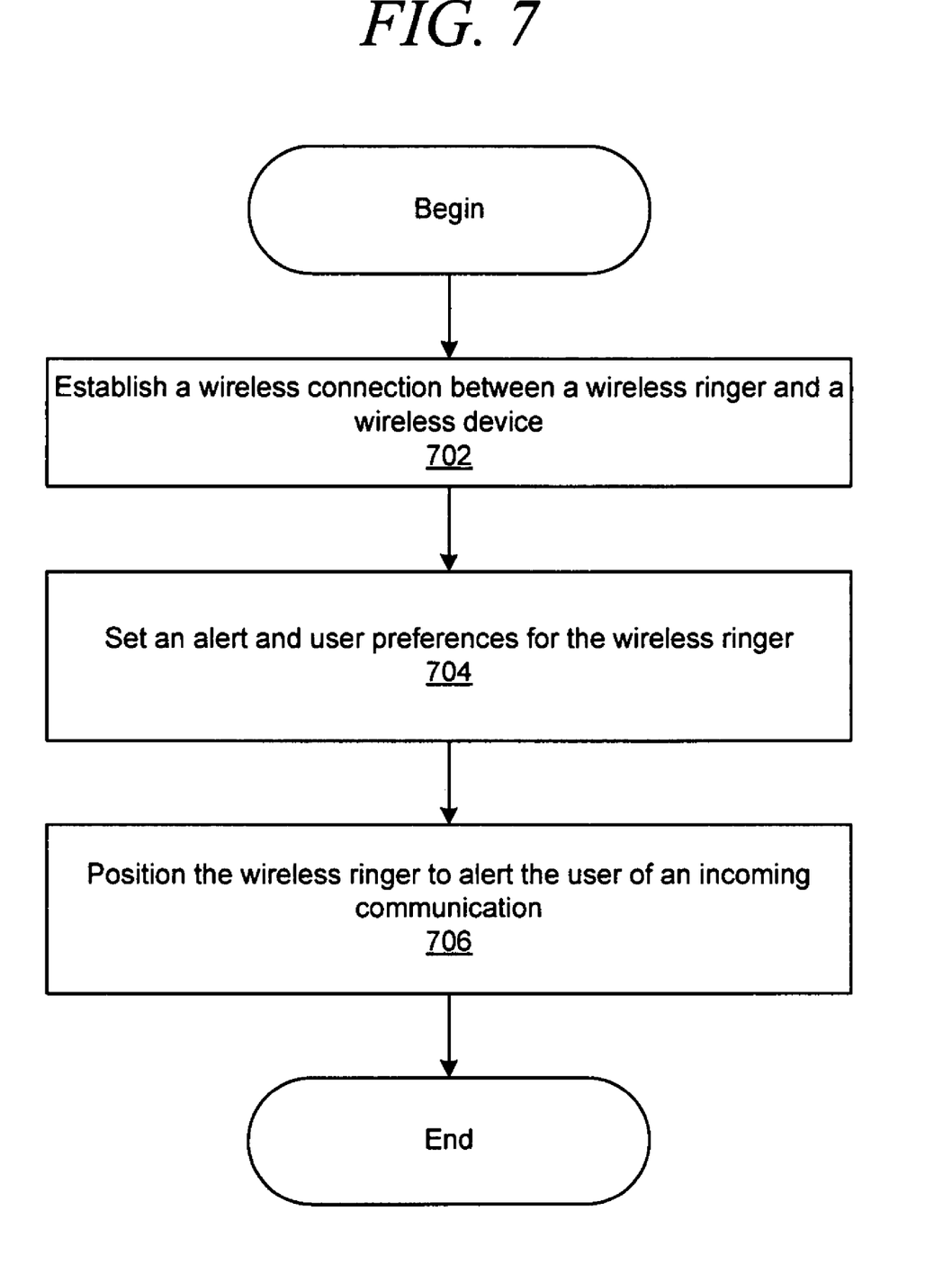
FIG. 7 is a flowchart of a process for using a wireless ringer in accordance with an illustrative embodiment of the present invention.

FIG. 7 is a flowchart of a process for using a wireless ringer in accordance with an illustrative embodiment of the present invention. The process of FIG. 7 may be implemented by a user with access to a wireless ringer and a wireless device. The process of FIG. 7 may be initiated to allow the wireless ringer to function with the wireless device for indicating a call or communication is incoming to the wireless device.

The process may begin with the user establishing a wireless connection between a wireless ringer and a wireless device (step 702). The wireless connection may be any type of wireless signal, communication session or link or protocol for exchanging control signals or data. The wireless connection may be encoded or encrypted for preventing outside parties from knowing communication is incoming to the wireless device. In one example, the link may be a Bluetooth connection. In one embodiment, the user may place the wireless device in a selection or search mode in order to establish the link between the wireless device and wireless ringer. The user may also manually program each device to connect with one another. The wireless device and wireless ringer may also automatically connect with one another once activated. For example, the wireless device may be configured to actively search for the wireless ringer when turned on. The wireless device may constantly or periodically search for a signal from the wireless ringer. The wireless connection or link ensures that the wireless device may communicate with the wireless ringer for ringing the wireless ringer when a communication is received by the wireless device.

Next, the user sets an alert and user preferences for the wireless ringer (step 704). In one embodiment, the wireless ringer may include default settings and user preferences so that step 704 may not be necessary unless selected by a user. For example, the wireless ringer may by default automatically use the ring selected for the wireless device. Alternatively, if the user has selected a custom ring tone, that ring tone may be communicated to the wireless ringer so that when a call is received the wireless ringer plays the custom ring tone as the alert. In another embodiment, the user may set the wireless ringer to vibrate, light up, or display a text or calling number as the alert. The user preferences and ringer settings may define how and when the alert or separation alarm is played by the wireless ringer, volume, alert settings for each type of communication and other configurations, features, and preferences of the wireless ringer. The wireless ringer may include any number of buttons, scroll wheels, knobs or other interfaces for receiving the user input that may be required for steps 702 and 704.

Next, the user may position the wireless ringer to alert the user of an incoming communication (step 706) with the process terminating thereafter. The wireless ringer may include a clip, straps, magnet, cradle or other securing means for attaching the wireless ringer to clothing, purse, bag, or other location in which the user may be able to receive the alert from the wireless ringer. In one embodiment, the wireless ringer may be decorated to appear or integrate as a clothing or fashion accessory. For example, the wireless ringer may be worn as a broach or a cuff link. The user may secure the wireless device in a purse or bag with the assurance that he/she may still be notified of incoming calls through the wireless ringer. The wireless ringer may be integrated with a personal accessory such as a watch, sunglasses, wallet, tie tack, necklace, or other personal item for subtly indicating communication is being received by the wireless device.

Figure 8:
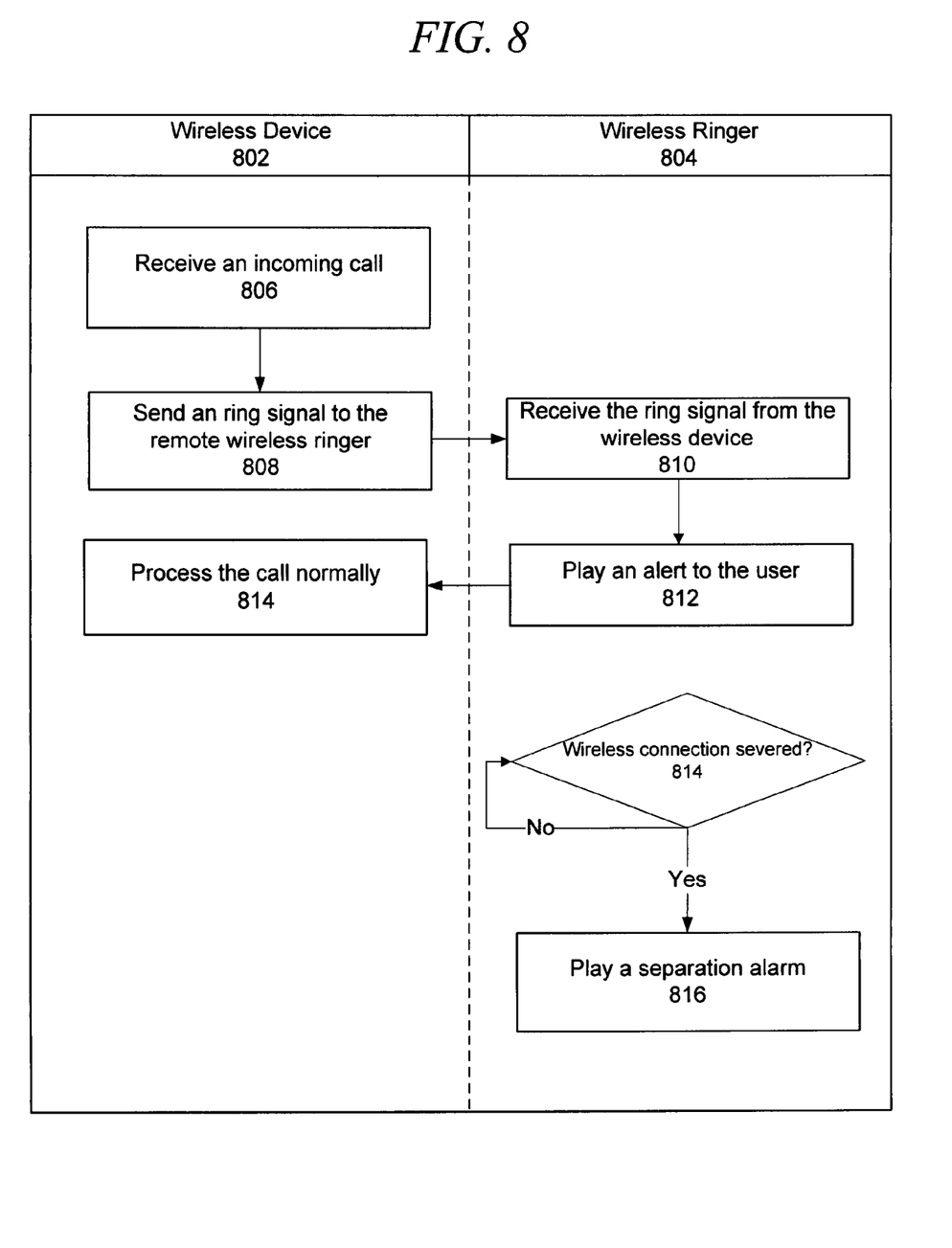
FIG. 8 is a flowchart of a process for implementing communication using a wireless ringer in accordance with an illustrative embodiment of the present invention.

FIG. 8 is a flowchart of a process for implementing communication using a wireless ringer in accordance with an illustrative embodiment of the present invention. The process of FIG. 8 may be implemented by a wireless device 802 and a wireless ringer 804. The process begins with the wireless device 802 receiving an incoming call (step 806). The incoming call of step 806 may be a voice, text, chat, email, or other message.

Next, the wireless device 802 sends a ring signal to the wireless ringer (step 808). The wireless ringer 804 receives the ring signal from the wireless device (step 810). The ring signal may be sent and received in steps 808 and 810 through a wireless connection or wireless link established between the wireless device 802 and the wireless ringer 804. The ring signal in steps 808 and 810 may be a control signal indicating that communication is incoming to the wireless device 802. In one embodiment, the ring signal may not include any data, but rather the ring signal may strictly control the operation of the wireless ringer. In another embodiment, the ring signal may include data regarding the type, sender, or content of the incoming communication that may be displayed or otherwise conveyed through the wireless ringer to the user. The ring signal of step 810 may also specify an alert that may be used by the wireless ringer 804 to inform the user of the type of communication being received by the wireless device 802. For example, if a text message is received, the ring signal may indicate that the wireless ringer 804 is to beep twice in succession.

Next, the wireless ringer 804 plays an alert to the user (step 812). In one embodiment, the alert of step 812 may be a pre-selected ring tone. In another embodiment, the alert may be one or more vibrations implemented by the wireless ringer 804. In yet another embodiment, the wireless ringer 804 may flash an LED or other light indicator and a text indicator indicating who and what is being communicated to the wireless device 802.

Next, the wireless device 802 processes the call normally (step 814). The user may select to retrieve the wireless device to answer the incoming communication or respond to it. Alternatively, the user may ignore the incoming communication to the wireless device 802. In either case, the call may be processed normally by allowing the user to answer a voice call without interference from the wireless ringer 804. In the event the user ignores the wireless device 802, the unanswered call may be processed by voicemail as the same as any other unanswered call. Text, chat, and email messages remain new until access or viewed by the user on the wireless device 802.

Independently, the wireless ringer 804 determines whether the wireless connection is severed (step 814). The wireless connection or link is the communication session established for exchanging data or control signals between the wireless device 802 and the wireless ringer 804. If the wireless connection is not severed in step 814, the wireless ringer continues to determine whether the wireless connection has been severed (step 814). As a result, while the wireless connection is active, the wireless ringer 804 is constantly determining the status of the wireless connection.

If the wireless connection has been severed in step 814, the wireless ringer 804 plays a separation alarm (step 816). The separation alarm may alert the user that the wireless connection is severed or that the wireless device 802 is separated from the wireless ringer 804 by a threshold distance. The separation alarm may also be a tone, ring, verbal alert, tactile response, flashing light(s), or other suitable means or mechanisms for obtaining the attention of the user and alerting the user that the wireless connection has been severed for whatever reason. In step 816, the wireless device 802 may also play a separation alarm The separation alarm may be particularly useful if the wireless device 802 is stolen or is about to be accidentally lost. In one example, the user may be able to specify how and when the separation, distance, or proximity alarm is activated. This user information may specify how the determination of step 814 is made.

The illustrative embodiments of the present invention allow the user to receive notification of incoming communication through a wireless ringer. As a result, a user may feel secure in storing or otherwise securing the wireless device because the user is assured that regardless of the position or inaccessibility of the wireless device, the user will still be able to be notified that communication is incoming. The wireless ringer may be positioned by the user for maximum effect. Default settings or customized alerts and user preferences may be used to effectively provide the desired alerts.

In another embodiment, the wireless ringer may be configured, set, or used to send a predefined response message to the caller or sender of an incoming communication. For example, when the alert of the wireless ringer is activated, the user may press a button on the wireless ringer to send a response message stating "My phone is out-of-reach so I will call or email you shortly."

The previous detailed description is of a small number of embodiments for implementing the invention and is not intended to be limiting in scope. The following claims set forth a number of the embodiments of the invention disclosed with greater particularity.

What is claimed:

1. A method for extending alerts for a wireless device, comprising:
    linking a wireless ringer and a wireless device through a wireless connection;
    receiving user input selecting alert preferences for the wireless ringer through an interface of the wireless device, the alert preferences indicating an alert utilized by the wireless ringer for each type of incoming communication,
    communicating the alert preferences from the wireless device to the wireless ringer in response to receiving the alert preferences through the interface; and
    alerting the wireless ringer in response to receiving an incoming communication on the wireless device in order for a user to access the wireless device to respond to the incoming communication, wherein the wireless ringer plays an alert based on the alert preferences for the type of incoming communication received by the wireless device;
    displaying communication information about the incoming communication to a display of the wireless ringer, the communication information indicating a party communicating with the user through the display; and
    playing a separation alarm to the user indicating separation between the wireless device and the wireless ringer, wherein the playing the separation alarm includes preselecting one of a plurality of alarms for playback by the wireless ringer, a selection of the plurality of alarms being associated with each of a plurality of threshold distances between the wireless ringer and the wireless device.

2. The method according to claim 1, wherein playback of the selection of the plurality of alarms intensify in response to an increasing distance corresponding to the plurality of threshold distances.

3. The method according to claim 1, wherein the alert specified by the user is performed by both the wireless ringer and the wireless device in response to receiving the incoming communication.

4. The method according to claim 3, wherein the communicating further comprises:
    synchronizing the alert specified for the wireless device with the alert used by the wireless ringer.

5. The method according to claim 1, wherein a plurality of alerts in user preferences include sounding a ring tone, visually displaying an incoming number, vibrating; and flashing a light.

6. The method according to claim 1, wherein the wireless ringer activates a perimeter light as the alert.

7. The method according to claim 1, further comprising:
    receiving the alert preferences through the interface of the wireless ringer, the wireless ringer synchronizing the alert preferences to the wireless device.

8. A remote wireless ringer, comprising:
    a transceiver configured to establish a wireless connection with a wireless device;
    a memory configured to store a plurality of alerts within user preferences, each of the plurality of alerts corresponding to one or more types of incoming communications received by the wireless device;
    a speaker configured to play one of the plurality of alerts, wherein the plurality of alerts informs a user of the incoming communication in order to allow the user to access the wireless device to respond to the incoming communication;
    a text display operable to display communication information about the incoming communication to a display of the remote wireless ringer, the communication information being set by the user preferences;
    a touch interface configured to receiver user input from the user for establishing the user preferences, wherein the touch interface is utilized to set how and when the plurality of alerts and a separation alarm is played to the user, and wherein the touch interface is operable to communicate a designated message to a communicating party sending the incoming communication in response to user input; and
    a synchronization module operable to synchronize the plurality of alerts and the user preferences with the wireless device.

9. The remote wireless ringer according to claim 8, further comprising:
    a vibrator configured to vibrate as one of the plurality of alerts, wherein the text display indicates a party communicating with the user through the display.

10. The remote wireless ringer according to claim 8, wherein the text display lights up in one of a plurality of colors corresponding to each of the types of communications.

11. The remote wireless ringer according to claim 8, wherein the remote wireless ringer receives a ring alert through the wireless connection, and wherein the remote wireless ringer is not configured to receive voice communication or data communication from the user.

12. The remote wireless ringer according to claim 8, further comprising:
    a clip configured to attaching the remote wireless ringer to a user's person.

13. The remote wireless ringer according to claim 8, wherein the wireless device includes a transceiver for communicating with the remote wireless ringer and a set of executable instructions for integrating features and the user preferences of the wireless device and the remote wireless ringer.

14. A remote wireless ringer, comprises:
    a processor for executing a set of instructions; and
    a memory for storing the set of instructions, wherein the set of instructions link a wireless ringer and a wireless device through a wireless connection, receive user preferences for the wireless ringer through an interface with the wireless device, receive a signal indicating an incoming communication from the wireless device in response to receiving the incoming communication on the wireless device, and alert a user of the incoming communication in response to receiving the signal, and alert designated by the user preferences informs the user of the incoming communication in order for the user to access the wireless device to respond to the incoming communication, wherein the user preferences indicates the alert utilized by the wireless ringer for each type of incoming communication; and
    wherein the set of instructions sounds an alarm in response to the wireless ringer and the wireless device being separated by a threshold distance, wherein the alarm includes a plurality of alarms played by the wireless ringer, a selection of the plurality of alarms being associated with each of a plurality of threshold distances, and the selection of the plurality of alarms intensify in response to an increasing distance corresponding to the plurality of threshold distances.

15. The remote wireless ringer according to claim 14, wherein the memory stores the user preferences, wherein the user preferences designate one of a plurality of alerts to be played to the user based on the type of the incoming communication, and wherein a display of the wireless ringer displays communication information about the incoming communication to the display of the wireless ringer, the communication information indicating a party communicating with the user through the display.

16. The remote wireless ringer according to claim 14, wherein the set of instructions control a speaker, a vibrator, and a text display according to the user preferences for playing a plurality of alerts based on the type of incoming communication.

17. The remote wireless ringer according to claim 14, wherein the wireless device includes the interface for sending and receiving data from the remote wireless ringer through the wireless connection, wherein the wireless device further includes an application for synchronizing the user preferences between the wireless device and the wireless ringer, and wherein the wireless ringer includes a user interface for setting the user preferences.

* * * * *